United States Patent
Boistault

(10) Patent No.: US 11,477,527 B2
(45) Date of Patent: Oct. 18, 2022

(54) AUTOMATIC-STANDBY METHOD

(71) Applicant: SAGEMCOM BROADBAND SAS, Rueil Malmaison (FR)

(72) Inventor: Etienne Boistault, Rueil Malmaison (FR)

(73) Assignee: SAGEMCOM BROADBAND SAS, Rueil Malmaison (FR)

( * ) Notice: Subject to any disclaimer, the term of this patent is extended or adjusted under 35 U.S.C. 154(b) by 35 days.

(21) Appl. No.: 16/968,806

(22) PCT Filed: Feb. 21, 2019

(86) PCT No.: PCT/EP2019/054268
§ 371 (c)(1),
(2) Date: Aug. 10, 2020

(87) PCT Pub. No.: WO2019/162354
PCT Pub. Date: Aug. 29, 2019

(65) Prior Publication Data
US 2021/0014561 A1  Jan. 14, 2021

(30) Foreign Application Priority Data
Feb. 26, 2018 (FR) ..................................... 1851640

(51) Int. Cl.
*H04N 21/443* (2011.01)
*G06F 16/48* (2019.01)
(Continued)

(52) U.S. Cl.
CPC ......... *H04N 21/4436* (2013.01); *G06F 16/48* (2019.01); *G06F 16/489* (2019.01);
(Continued)

(58) Field of Classification Search
CPC ............. H04N 21/4436; H04N 21/438; H04N 21/44222; H04N 21/462; H04N 21/4821
(Continued)

(56) References Cited

U.S. PATENT DOCUMENTS 8,849,097 B2 * 9/2014 Klappert .............. H04N 21/433
386/291
9,883,132 B2   1/2018 Gilson et al.
(Continued)

FOREIGN PATENT DOCUMENTS

CN    104580710 A    4/2015

OTHER PUBLICATIONS

Mar. 28, 2019 International Search Report issued in International Patent Application No. PCT/EP2019/054268.

*Primary Examiner* — Nasser M Goodarzi
*Assistant Examiner* — Jaycee Imperial
(74) *Attorney, Agent, or Firm* — Oliff PLC

(57) ABSTRACT

A method for automatically putting on standby an audio/video decoding system, including: obtaining information representing a program currently being broadcast by the system, referred to as the target program; performing a search for programs similar to the target program in accordance with at least one similarity criterion predefined in a database of information representing programs previously broadcast by the system, the broadcasting having been interrupted by a standby; determining a duration-of-inactivity threshold according to the number of programs similar to the target program; sending a notification intended for a user advising him of the imminent standby of the system if no interaction is noted between the user and system during a period equal to the duration-of-inactivity threshold determined after the end of the target program; and putting the system on standby if no interaction is noted between the user (Continued)

and system during a predefined period after sending of the notification.

13 Claims, 3 Drawing Sheets

(51) Int. Cl.
    *H04N 21/438*      (2011.01)
    *H04N 21/442*      (2011.01)
    *H04N 21/462*      (2011.01)
    *H04N 21/482*      (2011.01)

(52) U.S. Cl.
    CPC ..... *H04N 21/438* (2013.01); *H04N 21/44222* (2013.01); *H04N 21/462* (2013.01); *H04N 21/4821* (2013.01)

(58) Field of Classification Search
    USPC .......................................................... 725/14
    See application file for complete search history.

(56) References Cited

U.S. PATENT DOCUMENTS

| | | | |
|---|---|---|---|
| 10,231,016 B2* | 3/2019 | Kim | H04N 21/24 |
| 2003/0105794 A1 | 6/2003 | Jasinschi et al. | |
| 2008/0122934 A1* | 5/2008 | Marotti | H04N 5/782 |
| | | | 386/E5.067 |
| 2009/0195702 A1 | 8/2009 | Eshleman | |
| 2010/0262994 A1* | 10/2010 | Kawano | H04N 21/47 |
| | | | 725/39 |
| 2011/0154078 A1* | 6/2011 | Nrusimhan N.V. | G06F 1/3212 |
| | | | 713/323 |
| 2011/0197230 A1* | 8/2011 | Yu | H04N 21/4335 |
| | | | 725/40 |
| 2011/0261045 A1 | 10/2011 | Shimada | |
| 2014/0317237 A1* | 10/2014 | Barkai | H04N 21/4532 |
| | | | 709/219 |
| 2017/0359621 A1* | 12/2017 | Park | H04L 67/22 |

* cited by examiner

AUTOMATIC-STANDBY METHOD

The present invention relates to a method for managing automatic standby of an audio/video decoding system and a device implementing the method.

Reducing the energy consumption of electronic systems has become a major challenge. This is particularly the case with electronic systems intended to remain activated over long periods, or even to remain continuously activated. This is the case in particular with some computer servers, residential gateways, or Wi-Fi or PL (powerline) communication devices. One known means for reducing the energy consumption of an electronic system consists of operating this system in accordance with at least two modes: an operating mode known as active mode, wherein all the functionalities of the system are activated and the energy consumption of the system is high, and an operating mode known as standby mode wherein a limited number of functionalities of the device are activated and wherein the energy consumption of the system is at a minimum. Many systems also provide total switching off but standby mode is in general preferred to total switching off since it allows quicker restarting of the device.

An audio/video decoding device, also known as a TV set top box, is typically an electronic device for which the possibility of functioning in an active mode and a standby mode is useful. This is in fact a device that does not have to function in active mode continuously but which a user wishes to have restart quickly if needed.

In order to manage cases where users forget to put on standby, some electronic devices are equipped with an automatic standby module. In accordance with more or less elaborate standby criteria, these modules put the electronic devices on standby automatically without awaiting an explicit instruction from the users.

The document US 2009/0195702 A1 proposes an automatic-standby method for an electronic device based on an observation of a time of inactivity of the users. If no interaction is noted between the electronic device and a user during a predefined period, the electronic device goes on standby. This method therefore in no way takes into account the habits of the users. Moreover, if this method is adapted to a TV set top box, this method may cause the TV set top box to go on standby during a programme being broadcast by the TV set top box.

The document CN 104580710 A proposes a method for the automatic standby of an electronic device taking into account the habits of the users. The information representing the habits of the users is times of changing from active mode to standby mode and times of changing from standby mode to active mode. The use of this information improves the relevance of changes to standby mode but would not prevent a TV set top box going on standby during a programme being broadcast.

It is desirable to overcome these drawbacks of the prior art. It is in particular desirable to propose a method that makes it possible to more finely take into account the habits of the users of a TV set top box. It would also be desirable for this method to make it possible to prevent changes to standby mode during the broadcasting of a programme that is habitually viewed.

It is also desirable to provide a solution that is simple to implement at low cost.

According to a first aspect of the present invention, the present invention relates to a method for managing automatic standby of an audio/video decoding system, the method comprising: obtaining information representing a programme being broadcast by said system, referred to as the target programme; making a search for programmes similar to the target programme in accordance with one or more predefined similarity criteria in a database of information representing programmes previously broadcast by said system, the broadcasting of these programmes having been interrupted by a standby; determining a duration-of-inactivity threshold according to the number of programmes in the database similar to the target programme; initiating a standby procedure for the system if no interaction is found between a user and the system during a period equal to the duration-of-inactivity threshold determined after the end of the target programme.

In this way it is avoided putting a system on standby during the broadcasting of a programme that is habitually viewed by the user. Moreover, the system is put on standby more quickly when the target programme is known to be a programme after which the system is normally put on standby.

According to one embodiment, the standby procedure for the system comprises: sending a notification intended for a user advising said user of the imminent standby of said system if no interaction is noted between said user and said system during the period equal to the duration-of-inactivity threshold determined after the end of the target programme; and putting the system on standby if no interaction is noted between the user and the system during a predefined period after the sending of the notification.

According to one embodiment, for each programme in the database similar to the target programme following the or at least one of the predefined similarity criteria found during the search, for each criterion met, a counter value corresponding to said criterion is incremented by one unit and, when, following the search for similar programmes, the counter value corresponding to said criterion or to one of said criteria exceeds a predefined counter value corresponding to said criterion, the duration threshold is fixed at a first predefined duration and the target programme is declared to be a candidate for an accelerated standby, otherwise the duration threshold is fixed at a second predefined duration greater than the first predefined duration and the target programme is declared to be a candidate for a conventional standby.

According to one embodiment, prior to the sending of the notification and to the standby of the system, the method comprises: checking whether a programme immediately following the target programme is a candidate for accelerated standby or for conventional standby; sending the notification implementing the standby only if said following programme is a candidate for conventional standby.

According to one embodiment, the search for similar programmes is based on a criterion of similarity of name, a first programme the name of which corresponds to the name of a second programme at least by a predefined percentage being considered to be similar to the second programme, and/or on a criterion of similarity of start time, a first programme the start time of which is close to the start time of a second programme by a difference less than a first predefined difference is considered to be similar to the second programme, and/or on a criterion of similarity of end time, a first programme the end time of which is close to the end time of a second programme by a difference less than a predefined second difference is considered to be similar to the second programme.

According to one embodiment, the information representing programmes comes from an electronic programme guide received by the audio/video decoding system.

According to one embodiment, prior to use thereof, the database is created by extracting from the electronic programme guide, at each change of television channel on the audio/video decoding system or at predefined intervals, information representing a programme being broadcast, and then by storing the extracted representative information corresponding to the last programme broadcast before a standby in the database.

According to one embodiment, the database is stored in a non-volatile memory of the audio/video decoding system.

According to a second aspect of the invention, the invention relates to a device adapted for managing automatic standby of an audio/video decoding system comprising: means for obtaining information representing a programme being broadcast by said system, referred to as the target programme; means for seeking programmes similar to the target programme in accordance with one or more predefined similarity criteria in a database of information representing programmes previously broadcast by said system;

means for determining a duration-of-inactivity threshold according to the number of programmes in the database similar to the target programme;

and means for initiating a standby procedure for the system if no interaction is found between a user and the system during a period equal to the duration-of-inactivity threshold determined after the end of the target programme.

According to a third aspect of the invention, the invention relates to a computer program comprising instructions for implementing, by a device, the method according to the first aspect when said program is executed by a processor of said device.

According to a fourth aspect of the invention, the invention relates to storage means storing a computer program comprising instructions for implementing, by a device, the method according to the first aspect when said program is executed by a processor of said device.

The features of the invention mentioned above, as well as others, will emerge more clearly from the reading of the following description of an example embodiment, said description being made in relation to the accompanying drawings, among which:

Hereinafter we describe the invention in a context of a TV set top box. The invention could however be adapted to any electronic system able to function in an active mode and in a standby mode and capable of broadcasting audio and/or video programmes such as for example a radio receiver, a computer, a digital recorder or a digital television set. Moreover we mention hereinafter two operating modes: the active mode and the standby mode. However, the invention could just as well function in the context of a system able to function in accordance with an active mode and a plurality of different standby modes such as a light standby mode and a deep standby mode, the light standby mode making it possible to restart the electronic system more quickly than the deep standby mode, but on the other hand having higher electricity consumption than the deep standby mode.

Figure 1:
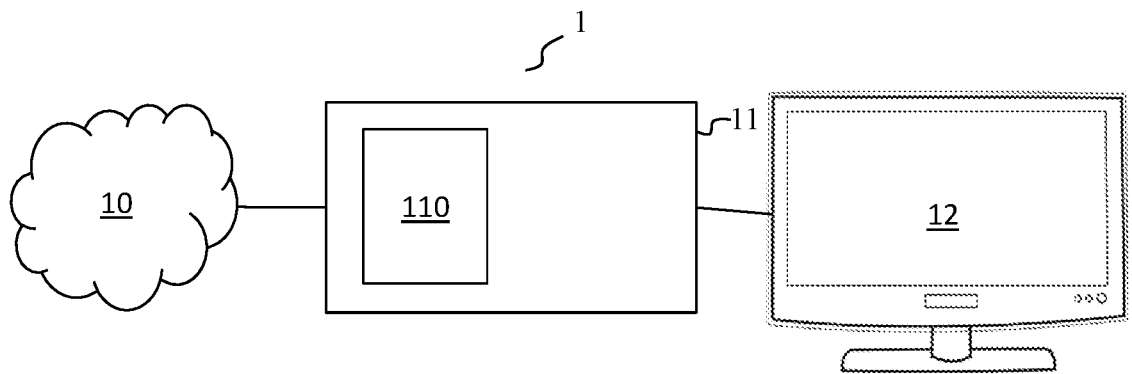
FIG. 1 illustrates schematically an example of a system wherein the invention is implemented.

FIG. 1 illustrates schematically an example of a system 1 wherein the invention is implemented.

The system 1 comprises a TV set top box 11 connected on the one hand to a screen 12 and on the other hand to a communication network 10. The communication network is for example a satellite, radio or cable broadcasting network. The TV set top box 11 receives from the communication network 10 a data stream comprising a plurality of multiplexed television channels and an electronic programme guide (EPG).

The data stream is for example a DVB (digital video broadcast) stream.

Each television channel contained in the DVB stream is received in a compressed format such as for example the MPEG-2 (Moving Picture Expert Group $2^{nd}$ Generation: ISO/IEC 13818-2), AVC (H264/AVC (ISO/IEC 14496-10—MPEG-4 Part 10, Advanced Video Coding/ITU-T H.264) or HEVC (High Efficiency Video Coding/ITU-T H.265) format.

The information for regenerating the electronic programme guide is encoded in the DVB stream in the form of DVB tables. This information comprises detailed information on television programmes (simply referred to as programmes hereinafter) either past, current or future, transmitted in the data stream. Among the DVB tables, there is a list of television channels contained in the stream, a list of services, timestamp information, and also an EIT (event information table) that describes the programmes broadcast by each television channel (name of the programme, start time, duration, etc.) and the services.

When the DVB stream is received, the TV set top box 11 demultiplexes it in order to extract the various audio/video streams corresponding to each channel and the information relating to the electronic programme guide. At least one of the audio/video streams is decoded for display on the screen 12. The information relating to the electronic programme guide, in particular the EIT tables, is also decoded in order to re-form the electronic programme guide.

The TV set top box 11 comprises a processing module 110 that executes the automatic-standby management method according to the invention when the TV set top box 11 is in active mode.

In one embodiment, the communication network 10 is an internet network. In this case, a residential gateway is connected to the network 10 and the TV set top box 11 is connected to the residential gateway.

It should be noted that the invention is adapted to other broadcasting technologies such as ATSC (Advanced Television System Committee), ISDB (Integrated Services Digital Broadcasting) and DTMB (Digital Terrestrial Multimedia Broadcast).

Figure 2:
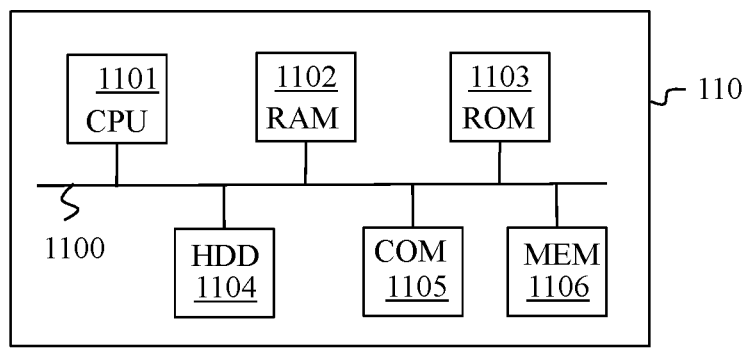
FIG. 2 illustrates schematically an example of hardware architecture of a processing module included in a TV set top box and implementing the invention.

FIG. 2 illustrates schematically an example of hardware architecture of the processing module 110 included in the TV set top box 11. The processing module 110 then comprises, connected by a communication bus 1100: a processor or CPU 1101; a random access memory 1102; a read only memory ROM 1103, a storage unit or a storage medium reader, such as an SD card reader 1104; a set of communication interfaces 1105 enabling the processing module 110 to communicate with other modules of the TV set top box 11, and in particular a module supplying it with the electronic programme guide, a module supplying it with notifications of change of the TV set top box 11, etc. The processing module 110 further comprises a non-volatile memory 1106 for storing information generated by the method even in the case of standby or complete stoppage of the TV set top box 11, in particular a database representing habits of a user of the TV set top box 11.

The processor 1101 is capable of executing instructions loaded in the RAM 1102 from the ROM 1103, from an external memory (not shown), from a storage medium, such as an SD card, or from a communication network. When the TV set top box 11 is powered up, the processor 1101 is capable of reading instructions from the RAM 1102 and executing them. These instructions form a computer program causing the implementation, by the processor 1101, of the method described in relation to FIGS. 3, 4 and 5.

Figure 3:
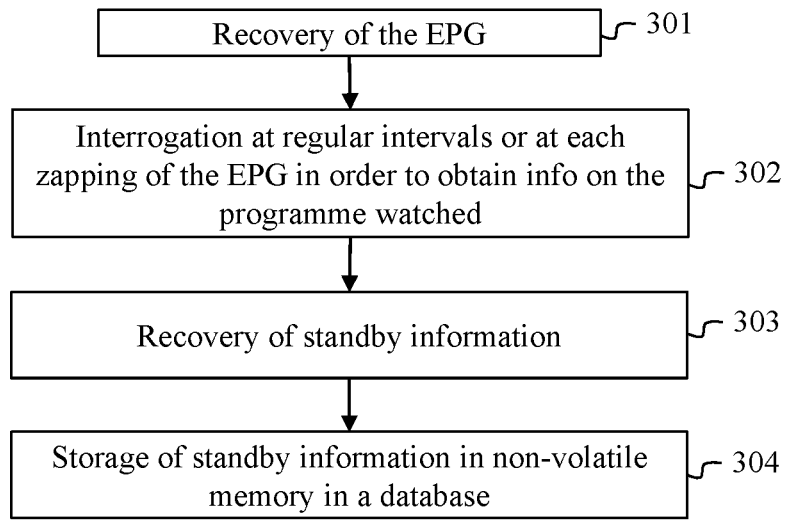
FIG. 3 illustrates schematically a method for creating and updating a programme database.
Figure 4:
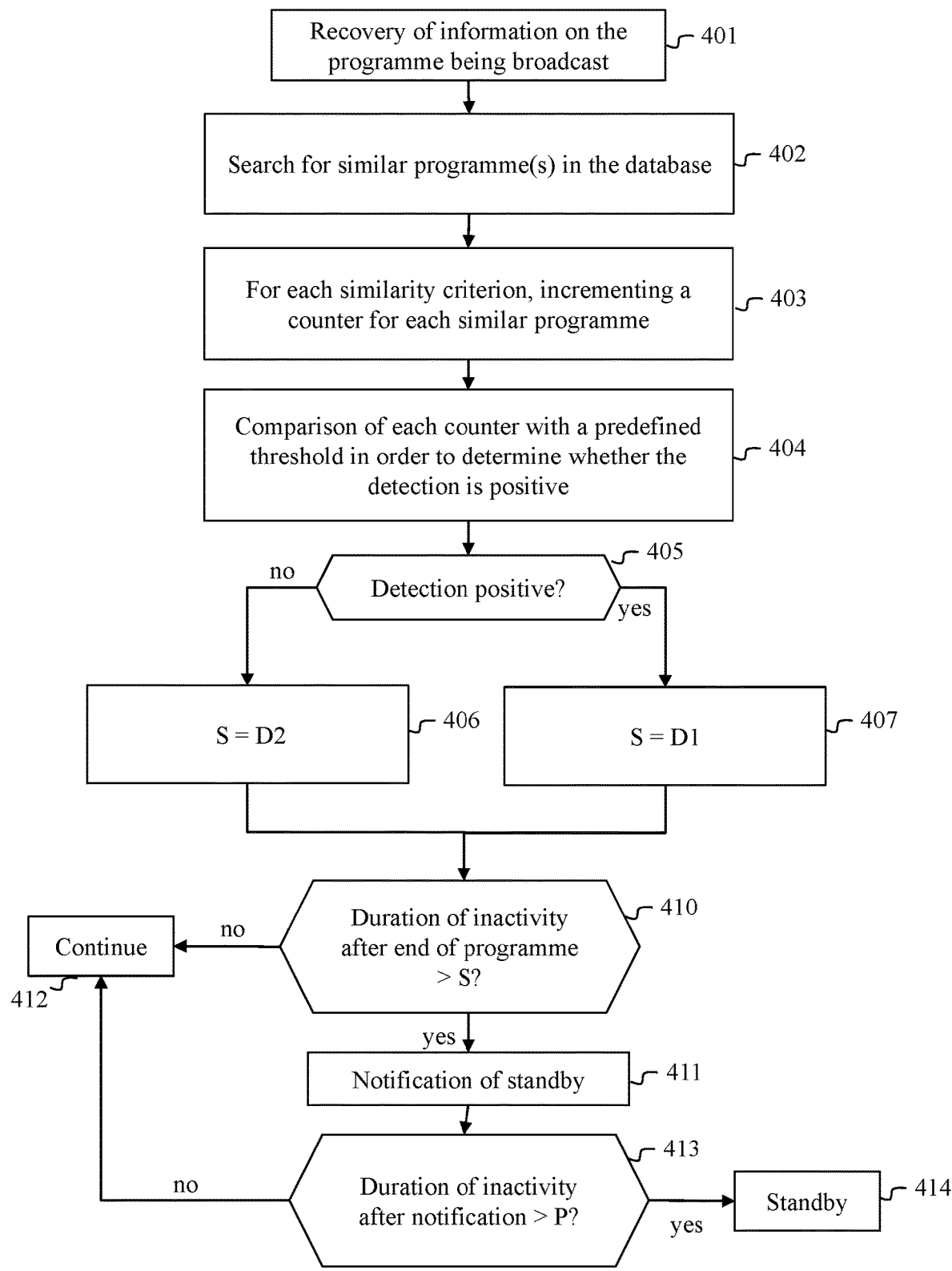
FIG. 4 illustrates schematically a first example of an automatic-standby method for a TV set top box.
Figure 5:
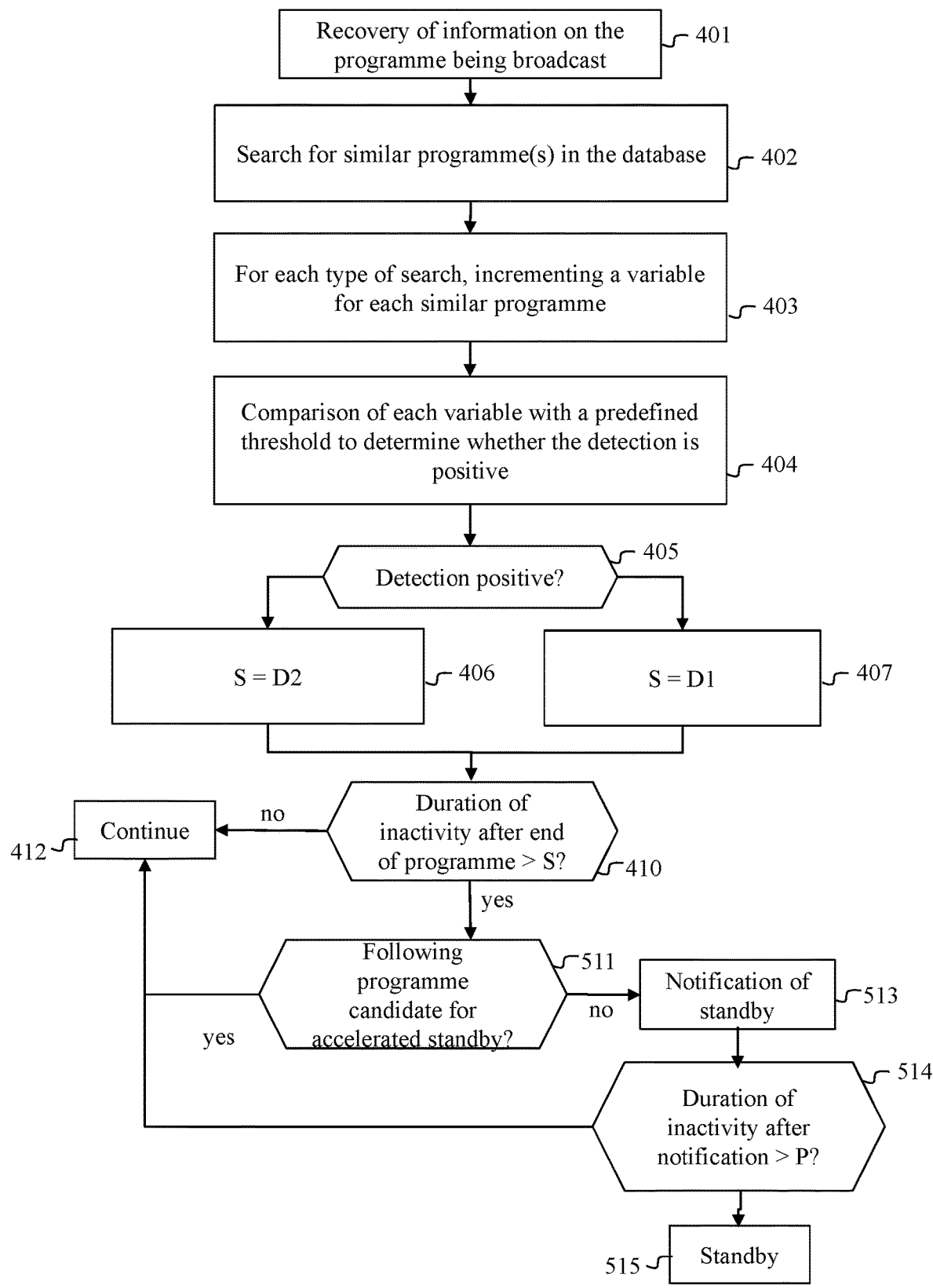
FIG. 5 illustrates schematically a second example of an automatic-standby method for a TV set top box.

All or some of the methods described in relation to FIGS. 3, 4 and 5 can be implemented in software form by the execution of a set of instructions by a programmable machine, such as a DSP (digital signal processor) or a microcontroller, or be implemented in hardware form by a machine or a dedicated component, such as an FPGA (field-programmable gate array) or an ASIC (application-specific integrated circuit).

The automatic-standby management method according to the invention takes into account habits of the user of the TV set top box 11. However, this method goes further than the methods of the prior art since this method is not based solely on statistics of times of going from the standby mode to the active mode and/or from the active mode to the standby mode, but also on an analysis of the programmes broadcast by the TV set top box 11 on the screen 12.

The automatic-standby management method uses a database of information on standby of the TV set top box 11, simply referred to as database hereinafter. This database is created and updated continuously by the processing module 110 when the TV set top box 11 is in active mode. The database is supplied with information representing standby extracted in particular from the electronic programme guide in accordance with a method described in relation to FIG. 3. Using this database, the processing module 110 determines when the TV set top box 11 can be put on standby in accordance with a method described in relation to FIG. 4 or according to FIG. 5.

FIG. 3 illustrates schematically a method for creating and updating the standby database.

In a step 301, the processing module 110 recovers or updates the electronic programme guide using information corresponding to this electronic programme guide contained in the data stream received by the TV set top box 11. This step is performed at regular intervals, for example every 10 minutes, by the processing module 110 so that the TV set top box 11 continuously has up-to-date knowledge of the electronic programme guide.

In a step 302, the processing module 110 interrogates the electronic programme guide in order to obtain information on the programme being broadcast by the TV set top box 11 on the screen 12. The step 302 is also performed regularly by the processing module 110, for example every minute, so that the processing module 110 continuously has knowledge of the programme broadcast by the TV set top box 11.

In a step 303, each time the TV set top box 11 goes into standby mode, the processing module 110 recovers a set of information representing the putting on standby and stores this set in the database during a step 304. The set of information representing the putting on standby comprises information representing a programme preceding the programme being displayed at the moment of putting on standby, referred to as the saved programme. The information representing the saved programme come from the electronic programme guide and comprises:

a programme name;
a date and time of start of the programme;
a date and time of end of the programme.

Each set of information representing a putting on standby stored in the database constitutes an input of the database. Each input is therefore information representing a programme previously broadcast by the TV set top box 11, the broadcasting of the programme following the saved programme having been interrupted by a putting on standby.

The database is for example a database of the SQL (Structured Query Language) type or to the JSON (JavaScript Object Notation) format or XML (Extensible Markup Language) format. This database is stored in the non-volatile memory 1106 so as to be kept by the processing module 110 in the event of the TV set top box 11 being put on standby or being completely switched off.

On reading the method described in relation to FIG. 3, it will be realised that the database is supplied whenever the TV set top box 11 is put on standby. However, the habits of a user may change over time. In order to keep in the database information representing current habits of the user, the number of inputs stored in the database is limited to a predefined maximum number. For example, the predefined maximum number is fixed at one hundred. The processing module 110 therefore keeps at a maximum one hundred inputs, corresponding to the most recent one hundred inputs. When the predefined maximum number is reached, the oldest inputs are replaced by more recent inputs. The database therefore functions as a FIFO (first in, first out).

In one embodiment, the information on the putting on standby further comprises, for each input in the database, a date and time when the TV set top box 11 was put on standby. The processing module 110 then uses these dates and times of putting on standby in order to determine the oldest inputs in the database.

In one embodiment, the set of information representing the putting on standby comprises information representing the television channel that broadcast the saved programme. Consequently each input in the database further comprises information representing a television channel.

The database thus created and updated is used by an automatic-standby method. Two examples of automatic-standby methods are described in relation to FIGS. 4 and 5. One or other of these two methods is implemented at each start of broadcasting of a new television channel by the TV set top box 11 (i.e. each time the TV set top box 11 goes into active mode, each time the television channel is changed, etc.) and at each change to a new programme. The programme currently being broadcast is analysed by the processing module 110 using the methods described in relation to FIG. 4 or 5 in order to determine whether the TV set top box 11 can be put on standby after the end of said programme. The programmes thus analysed are referred to hereinafter as target programmes.

FIG. 4 illustrates schematically a first example of an automatic-standby method for a TV set top box.

In a step 401, the processing module 110 obtains information representing a target programme. To do this, the processing module 11 interrogates the electronic programme guide. The information obtained comprises:

the name NAME of the target programme;
the date D1 and the time T1 of the start of the target programme;
the date D2 and the time T2 of the end of the target programme.

From the date D2 and the time T2 of the end of the target programme, the processing module 110 determines the date and time of the next execution of the automatic-standby method. In one embodiment, the processing module 110 adds a predefined duration Δ to the date D2 and to the time T2. For example, the predefined duration Δ equals five minutes. In this example, the automatic-standby method is therefore reinitiated five minutes after the end of each programme broadcast by the TV set top box 11, if there has not been any change in television channel in the meantime.

In a step 402, the processing module 110 makes a search for programmes similar to the target programme in accordance with one or more similarity criteria predefined in the database. In one embodiment, the number of similarity criteria is equal to three.

A first similarity criterion is a name similarity criterion. A first programme the name of which corresponds to the name of a second programme at least to a predefined percentage P is considered to be similar to the second programme. A first name is similar to a second name to a percentage of P %, when P % of the symbols constituting these names are identical and situated at the same position in the name. In one embodiment P=80%.

A second criterion is a criterion of similarity of start time. A first programme the start time of which is close to the start time of a second programme with a difference e smaller than a predefined difference E1 is considered to be similar to the second programme.

A third criterion is a criterion of similarity of end time. A first programme the end time of which is close to the end time of a second programme with a difference e smaller than the predefined difference E2 is considered to be similar to the second programme.

In one embodiment, E1=E2=1 minute.

In one embodiment, E1=1 minute and E2=5 minutes.

A counter value is associated with each similarity criterion. The first criterion is associated with a counter c1, the second criterion is associated with a counter c2 and the third criterion is associated with a counter c3.

In a step 403, for each programme in the database similar to the target programme found in accordance with at least one of the three similarity criteria, the processing module 110 increments by one unit the counter corresponding to each similarity criterion met. For example, c1 is incremented by one unit for each input in the database comprising a name similar to the name of the target programme, c2 is incremented by one unit for each input in the database comprising a start time similar to the start time of the target programme, c3 is incremented by one unit for each input in the database comprising an end time similar to the end time of the target programme. For the same input in the database, one, two or three counters may be incremented according to the number of criteria met.

Following the search for similar programmes in the database, each counter is compared with a predefined counter value. When, for at least one of the counters, the value of said counter exceeds the predefined counter value, the processing module 110 considers, in a step 405, that it is a positive detection. Otherwise the processing module considers that it is a negative detection.

For example, let C1 (and respectively C2 and C3) be the predefined counter value corresponding to the first (and respectively to the second and to the third) similarity criterion. If c1>C1 and/or c2>C2 and/or c3>C3, the processing module 110 considers that it is a positive detection. If c1≤C1 and c2≤C2 and c3≤C3, the processing module 110 considers that it is a negative detection. In one embodiment C1=C2=C3=10.

In steps 406 and 407, the processing module 110 determines a duration-of-inactivity threshold S according to the number of programmes in the database similar to the target programme.

In the step 407, performed when the detection is positive, the processing module 110 fixes the duration-of-inactivity threshold S at a value D1. The target programme is then considered to be a candidate for an accelerated standby.

In the step 406, performed when the detection is negative, the processing module 110 fixes the duration-of-inactivity threshold S at a value D2, D2 being greater than D1. The target programme is then considered to be a candidate for conventional standby.

In one embodiment, D1=20 minutes and D2=120 minutes.

Following the steps 406 and 407, the processing module 110 performs a step 410.

In the step 410, following the end of the target programme, the processing module 110 awaits an interaction between the user and the TV set top box 11. An interaction between a user and the TV set top box 11 is, for example, a pressing on a button of the TV set top box 11 or on a remote-control button or a voice command. If no interaction is noted between a user and the TV set top box 11 by the processing module 110 after the end of the programme being broadcast during a period equal to the duration-of-inactivity threshold S determined, the processing module 110 sends, in a step 411, a notification intended for the user advising said user of the imminent standby of the TV set top box 11. This notification is, for example, a message to be displayed on the screen 12.

If, in a step 413 following this notification, no interaction between a user and the set top box 11 is noted during a predefined period P, equal for example to one minute, the processing module 110 puts the TV set top box 11 on standby in a step 414.

If an interaction is noted between a user and the TV set top box either before the end of the period equal to the duration-of-inactivity threshold S determined following the end of the current programme, or before the end of the predefined period P following the sending of the notification, the processing module 110 does not send a notification. The TV set top box 11 is then not put on standby but continues the broadcasting of the current programme during a step 412 (the current programme at this stage of the method being a programme following the target programme).

The duration-of-inactivity threshold is therefore adjusted according to the habits of the user. If the user is in the habit of putting the TV set top box 11 on standby during a given programme, the duration-of-inactivity threshold following programmes similar to the given programme is short. If the user is not in the habit of putting the TV set top box 11 on standby during a given programme, the duration-of-inactivity threshold following programmes similar to the given programme is long. The reduction in the energy consumption by putting the TV set top box on standby is therefore greater when a programme is recognised as being a programme during which the TV set top box 11 is habitually put on standby. Moreover, the invention makes it possible to avoid putting on standby during a programme that is habitually watched.

In one embodiment, C1, C2 and C3 are different and for example equal respectively to 5, 10 and 20.

In the embodiment wherein each input in the database comprises information representing a television channel, the processing module 110 obtains, in the step 401, information representing the television channel broadcasting the target programme. This information is used in addition to the information about the name NAME of the target programme, the date D1 and the time T1 of the start of the target programme and the date D2 and the time T2 of the end of the target programme. For example, for two programmes to be considered to be similar in accordance with the name criterion, it is necessary for these two programmes to be broadcast on the same television channel. For two programmes to be considered to be similar in accordance with the criterion of similarity of start time, it is necessary for them to be broadcast on the same television channel. Finally, for two programmes to be considered to be similar according to the criterion of similarity of end time, it is necessary for them to be broadcast on the same television channel.

In one embodiment, a fourth similarity criterion is a combination of at least two of the first, second and third similarity criteria.

In one embodiment, a fifth criterion is a combination of the second similarity criterion (a criterion of similarity of start time) and a criterion of similarity of duration of two programmes compared. For example, if two programmes meet the criterion of similarity of start time and have an equal duration to within plus or minus Δ%, then these two programmes are considered to be similar. For example Δ=25%.

In one embodiment, the day of the week is taken into account in the similarity criterion. For example, two programmes are considered to be similar if they meet at least one of the first, second, third or fifth criteria and if they are broadcast on a day having the same name in a week (for example the two programmes were broadcast on a Monday). In another example, two programmes are considered to be similar if they meet at least one of the first, second, third or fifth criteria and have been broadcast in the same part of the week. A week is for example divided into two parts, a first part being composed of Monday, Tuesday, Wednesday, Thursday and Friday and a second part being composed of Saturday and Sunday. In this example, a programme broadcast on a Tuesday is considered to be different from a programme broadcast on a Saturday, even if the two programmes meet the criterion of similarity of start time.

It should be noted that the number of similarity criteria observed could be different from three without changing the principle of the invention, but must be greater than or equal to one.

FIG. 5 illustrates schematically a second example of an automatic-standby method for a TV set top box.

The method described in relation to FIG. 5 comprises the previously described steps 401 to 407, 410 and 412.

When, in the step 410, the processing module 110 determines that no interaction has been noted between a user and the TV set top box 11 during a period equal to the duration-of-inactivity threshold S, the processing module 110 determines whether a programme immediately following the target programme is a candidate for accelerated standby or conventional standby. The programme immediately following the target programme is, at this stage of the method, the programme currently being broadcast. To do this, the processing module 110, during the step 410, applies the steps 401 to 405 to the programme following the target programme. In the case of positive detection during the step 405, the programme following the target programme is declared to be a candidate for an accelerated standby. Otherwise the programme following the target programme is declared to be a candidate for a conventional standby.

If the programme following the target programme is a candidate for conventional standby, the step 511 is followed by steps 513, 514 and 515, which are respectively identical to the steps 411, 413 and 414.

Otherwise, if the programme following the target programme is a candidate for an accelerated standby, the processing module 110 does not send a notification, does not put the TV set top box 11 on standby and continues the broadcasting of the current programme. This is because, in the latter case, since the programme following the target programme is a candidate for a standby, this means that the user habitually watches this programme and that it is only after the end of this programme that the processing module can envisage putting the TV set top box on standby.

The invention claimed is:

1. A method for managing automatic standby of an audio/video decoding system, wherein the method comprises:
   obtaining information representing a program being broadcast by said system, referred to as the target program;
   making a search for programs similar to the target program in accordance with one or more predefined similarity criteria in a database of information representing programs previously broadcast by said system, the broadcasting of these programs having been interrupted by a standby;
   determining a duration-of-inactivity threshold according to the number of programs in the database similar to the target program;
   initiating a standby procedure for the system if no interaction is found between a user and the system during a period equal to the duration-of-inactivity threshold determined after the end of the target program.

2. The method according to claim 1, characterised in that the standby procedure for the system comprises:
   sending a notification intended for a user advising said user of the imminent standby of said system if no interaction is noted between said user and said system during the period equal to the duration-of-inactivity threshold determined after the end of the target program; and
   putting the system on standby if no interaction is noted between the user and the system during a predefined period after the sending of the notification.

3. The method according to claim 1, wherein, for each program in the database similar to the target program following the or at least one of the predefined similarity criteria found during the search, for each criterion met, a counter value corresponding to said criterion is incremented by one unit and, when, following the search for similar programs, the counter value corresponding to said criterion or to one of said criteria exceeds a predefined counter value corresponding to said criterion, the duration threshold is fixed at a first predefined duration and the target program is declared to be a candidate for an accelerated standby, otherwise the duration threshold is fixed at a second predefined duration greater than the first predefined duration and the target program is declared to be a candidate for a conventional standby.

4. The method according to claim 3, wherein, prior to the sending of the notification and to the standby of the system, the method comprises:
   checking whether a program immediately following the target program is a candidate for accelerated standby or for conventional standby;
   sending the notification implementing the standby only if said following program is a candidate for conventional standby.

5. The method according to claim 1, wherein the search for similar programs is based on a criterion of similarity of name, a first program the name of which corresponds to the name of a second program at least by a predefined percentage being considered to be similar to the second program, and/or on a criterion of similarity of start time, a first program the start time of which is close to the start time of a second program by a difference less than a first predefined difference is considered to be similar to the second program, and/or on a criterion of similarity of end time, a first program the end time of which is close to the end time of a second program by a difference less than a predefined second difference is considered to be similar to the second program.

6. The method according to claim 1, wherein the information representing programs comes from an electronic program guide received by the audio/video decoding system.

7. The method according to claim 6, wherein, prior to use thereof, the database is created by extracting from the electronic program guide, at each change of television channel on the audio/video decoding system or at predefined intervals, information representing a program being broadcast, and then by storing the extracted representative information corresponding to the last program broadcast before a standby in the database.

8. The method according to claim 1, wherein the database is stored in a non-volatile memory of the audio/video decoding system.

9. A non-transitory computer readable storage medium, storing a computer program comprising instructions for implementing, by a device, the method according claim 1 when said program is executed by a processor of said device.

10. The method according to claim 1, further comprising determining the number of programs in the database that are similar to the target program.

11. The method according to claim 1, wherein the determining a duration-of-inactivity threshold according to the number of programs in the database similar to the target program comprises:
setting the duration-of-inactivity threshold to a first duration-of-inactivity set threshold in response to the number of programs being greater than a counter value threshold; and
setting the duration-of-inactivity threshold to a second duration-of-inactivity set threshold in response the number of programs being less than the counter value threshold.

12. A device adapted for managing automatic standby of an audio/video decoding system, wherein the device comprises circuitry causing the device to perform:
obtaining information representing a program being broadcast by said system, referred to as the target program;
seeking programs similar to the target program in accordance with one or more predefined similarity criteria in a database of information representing programs previously broadcast by said system;
determining a duration-of-inactivity threshold according to the number of programs in the database similar to the target program;
initiating a standby procedure for the system if no interaction is found between a user and the system during a period equal to the duration-of-inactivity threshold determined after the end of the target program.

13. A method for managing automatic standby of an audio/video decoding system, wherein the method comprises:
obtaining information representing a target program being broadcast by the audio/video decoding system;
determining an amount of programs similar to the target program in accordance with one or more predefined similarity criteria in a database of information representing programs previously broadcast by the audio/video decoding system, the broadcasting of the previously-broadcasted programs having been interrupted by a standby;
determining a duration-of-inactivity threshold according to the amount of programs in the database similar to the target program;
initiating a standby procedure for the audio/video decoding system if no interaction is found between a user and the audio/video decoding system during a period equal to the duration-of-inactivity threshold determined after an end of the target program.

* * * * *